United States Patent
Friedrich et al.

(10) Patent No.: US 7,347,120 B2
(45) Date of Patent: Mar. 25, 2008

(54) ROBOT OF SCARA TYPE

(75) Inventors: Boris Friedrich, Stuttgart (DE); Volker Henrichs, Ludwigsburg (DE); Andreas Jenke, Bietigheim-Bissingen (DE); Delf Reumann, Stuttgart (DE)

(73) Assignee: Staubli Faverges, Faverges (FR)

( * ) Notice: Subject to any disclaimer, the term of this patent is extended or adjusted under 35 U.S.C. 154(b) by 723 days.

(21) Appl. No.: 10/972,816

(22) Filed: Oct. 25, 2004

(65) Prior Publication Data
US 2005/0087034 A1 Apr. 28, 2005

(30) Foreign Application Priority Data
Oct. 23, 2003 (DE) ................. 103 49 452

(51) Int. Cl.
*B25J 17/00* (2006.01)
(52) U.S. Cl. ............... 74/490.01; 74/490.03; 901/23; 414/744.5
(58) Field of Classification Search ............ 74/490.01, 74/490.03; 901/19, 23, 48; 414/744.1, 744.5
See application file for complete search history.

(56) References Cited

U.S. PATENT DOCUMENTS

| | | | | |
|---|---|---|---|---|
| 4,725,965 A | * | 2/1988 | Keenan | 700/254 |
| 4,784,014 A | | 11/1988 | Bruns et al. | |
| 5,000,653 A | | 3/1991 | Gosdowski | |
| 5,006,744 A | * | 4/1991 | Archer et al. | 310/89 |
| 5,658,121 A | * | 8/1997 | Hashimoto | 414/744.1 |
| 5,768,768 A | * | 6/1998 | Best | 29/792 |
| 5,945,011 A | * | 8/1999 | Takano et al. | 219/108 |
| 6,408,710 B1 | | 6/2002 | Kullborg et al. | |
| 6,494,666 B2 | * | 12/2002 | Wu et al. | 414/744.3 |
| 6,731,091 B2 | | 5/2004 | Hietmann et al. | |
| 2002/0014874 A1 | | 2/2002 | Hietmann et al. | |
| 2005/0078159 A1 | * | 4/2005 | Yamazaki et al. | 347/101 |
| 2007/0020081 A1 | * | 1/2007 | Gilchrist et al. | 414/744.5 |
| 2007/0173393 A1 | * | 7/2007 | Massaro | 483/16 |

FOREIGN PATENT DOCUMENTS

| | | |
|---|---|---|
| DE | 35 22 336 A1 | 1/1987 |
| DE | 297 11 523 U1 | 9/1998 |
| EP | 1 043 643 A2 | 10/2000 |
| EP | 1 170 097 A1 | 1/2002 |
| JP | 9-66479 | 3/1997 |
| JP | 11-138488 | 5/1999 |

* cited by examiner

*Primary Examiner*—David M. Fenstermacher
(74) *Attorney, Agent, or Firm*—Dowell & Dowell, P.C.

(57) ABSTRACT

A SCARA robot has a robot console, a first robot arm articulated on the robot console and swivelable about a first swivel axis, a second swivel arm articulated on the first swivel arm and swivelable around the second swivel axis extending substantially parallel to the first swivel axis, at least one work unit, at least one first swivel motor for swiveling an arm unit composed of the first and second robot arms relative to the robot console, at least one second swivel motor for turning the second robot arm relative to the first robot arm, and at least one work motor for actuating the work unit, with the motors being controllable by a power electronics, with electrical circuits including convertor circuits for current supply of the motors and at least one control circuit for operating the convertor circuits and thereby for controlling the motors, and with at least one rectifier circuit being received in at least one robot arm.

23 Claims, 5 Drawing Sheets

ROBOT OF SCARA TYPE

BACKGROUND OF THE INVENTION

The present invention relates to a SCARA robot.

More particularly, it relates to a SCARA robot which has robot body parts including a robot console, a first robot arm articulated on the robot console and swivelable about a first swivel axis, and a second robot arm articulated on the first robot arm and with a second swivel axis that is substantially parallel to the first swivel axis and also provided with at least one work unit. The robot further has at least one first swivel motor for swiveling an arm unit of the first and second robot arms relative to the robot console, at least one second swivel motor for swiveling the second robot arm relative to the first robot arm, and at least one working motor for actuating the work unit. The motors are controllable by a power electronics which includes electrical circuits with convertor circuits for current supply of the motors as well as with at least one control circuit for operation of the convertor circuits and thereby for controlling the motors. At least one circuit including the convertor circuit and the control circuit is arranged in at least one of the robot arms on a wall portion of a housing of the robot arm associated with the circuit.

Such a robot which is however not of a SCARA type, is disclosed for example in the European patent document EP 1 170 097 B1. Such robots are used for example on assembly lines for performance of mounting works.

A SCARA robot in which however circuits are not arranged on robot arm is disclosed in U.S. Pat. No. 5,000,653 A.

For these robots, as for manufacturing and mounting devices in general, there is a requirement to provide a maximum possible efficiency with a maximum possible compactness. This is true not only for the mechanical part of the robot, or in other words for the structural design of the robot body parts, but also for the electronics required for the operation of the robot. For reducing the required space it was proposed in the European patent document 1 170 097 B1 to arrange the drive electronics in the robot arms, and in particular with the consideration of a possible low thermal influence of the drive electronics on the robot structure, in order not to affect the movement accuracy.

It should be finally mentioned in connection with the distributed drives of a total system, the European patent document EP 1 043 643 A2 which discloses a cable system for cable connection of a cell, wherein the cell has a central module as well as drives. The central module of the disclosed cell is connectable with the electrical power network through power current conductors and can obtain informations from priority units and transfer the informations to them. The drives include electric motors and associated convertors, wherein the convertors and the electric motors each form a structural assembly. Between the drives and the central module, a star connection structure is provided, or in other words each drive is joined through its own conductor for connection with the central module. Drive current and drive informations are transmitted through this connecting conductor.

A work unit of a SCARA robot formed as a robot spindle is disclosed in the Japanese patent document JP 620 490 70. The robot spindle is both turnable around its longitudinal axis and also independently from a rotation, around the longitudinal axis is displaceable in direction of its longitudinal axis.

The hinge joints of the robot body parts with one another can be realized in a known manner with a so-called "harmonic drive" transmission, as disclosed in the German patent document DE 35 22 336. These transmissions are characterized with a high transmission ratio and clearance-free nature.

SUMMARY OF THE INVENTION

Accordingly, it is an object of the present invention to provide a SCARA robot which has improved dynamic properties, wherein robot arms are movable with a low force consumption and fast between two positions.

In keeping with these objects and with others which will become apparent hereinafter, one feature of the present invention resides, briefly stated, in a SCARA robot of the above mentioned general type, in which the robot arm with respect to the corresponding swivel axis of the robot arm has a swivel axis-proximal and a swivel axis-distal housing portion, and the housing wall portions with circuits arranged on them are arranged in the swivel axis-proximal housing portion.

With the inventive arrangement of at least one circuit arranged on the housing wall portion of the SCARA robot in the swivel axis-proximal housing portion, the mass moments of inertia of the corresponding robot arm can be reduced. Thereby the arm with the predetermined drive force can be accelerated faster and therefore can move faster. On the other hand, for its acceleration it requires a lower drive force than a robot arm with a greater mass moment of inertia and the same acceleration. Simultaneously, with the known arrangement of at least one circuit in the at least one robot arm on an associated wall portion, a housing of the robot arm of the SCARA robot can be formed compact, in particular with a smaller switch cabinet. The housing of the SCARA robot can contribute to cooling of the at least one circuit by arranging the at least one circuit on the housing wall.

With the given arrangement of the at least one circuit on a housing wall portion, the minimum possible mass moment of inertia can be obtained when the housing wall portion with the at least one circuit arranged on it is the housing wall portion with the shortest distance from the swivel axis of the robot arm.

As a rule, several electrical circuits are received in at least one robot arm of the inventive SCARA robot. For providing a balanced mass distribution with a simultaneous effective cooling of these circuits, it is advantageous when each circuit of at least a part of these circuits, preferably of all circuits, is arranged on another associated wall portion of the housing of the robot arm.

Furthermore, the robot arm can have a plurality of electrical circuits, which are received in it. Then on the basis of a lowest possible mass moment of inertia with respect to the swivel axis of the robot arm, it is advantageous when the housing wall portions on which the electrical circuits of the power electronics are arranged, are located in the swivel axis-proximal housing portion. Such a robot arm can be rotationally accelerated faster with the same motor power because of its lower mass moment of inertia.

For reducing the mass moment of inertia of the housing wall portion on which electrical circuits of the power electronics are arranged, it is advantageous to use the housing wall portions with the shortest distances from the swivel axis of the respective robot arm. It is especially advantageous when these housing wall portions are formed flat for facilitating the arrangement of the circuits, and when desired, of cooling bodies.

Based on the conversion of the currents required for driving a motor in the robot arm, first of all the convertor circuits have a great mass. Therefore, in view of a lowest possible mass moment of inertia, it is advantageous when the at least one swivel axis-proximal circuit is a convertor circuit.

In accordance with a further embodiment of the invention, all convertor circuits and control circuits of the power electronics can be received in the robot body parts including robot arms and a robot console. This allows a further reduction of the switch cabinet required for the operation of the SCARA robot and reduces the mounting expenses substantially during an exchange of a robot arm or generally during assembly of the SCARA robot.

A distributed arrangement of electrical circuits of the power electronics on the robot body parts can lead under certain conditions to an increased expense for cable connection, which represents also a potential source of failure during the robots mounting or robot operation. For maintaining cables provided between the circuits of the power electronic and the respective motors as simple as possible, the SCARA robot can be formed further so that at least one convertor conduit is associated with each motor, and the associated circuit is received in the same robot body part, in particular a robot arm, as the respective motor.

It should not be excluded that in accordance with a preferable further embodiment of the invention, for reduction of the expenses for cables, also the control circuits are received in the same robot body part, in particular the robot arm, as a motor controlled by them or in some cases a plurality of motors controlled by them. Frequently, a control circuit is associated with a plurality of motors. However, the SCARA robot can be designed so that a control circuit is not associated with motors in different robot body parts.

The receiving of the electrical circuits in a robot arm further raises the problem of a corresponding cooling of these circuits. An effective cooling thereby can be provided when alternatively or additionally the cooling bodies are associated with at least a part of the electrical circuits and form an outer wall portion, for example preferably also an inner wall portion of a housing a robot arm. These cooling bodies can be provided in a known manner with ribs and/or produced of a material with a particularly high thermal conductivity, such as aluminum.

With the fast movements of the robot arm during a robot operation, the cooling body composed of an outerwall portion of the housing of a robot arm is continuously ventilated around it, which improves the cooling. It can be sufficient to place the cooling body for forming the outer wall portions from outside on the housing of the robot arm. With respect to an effective cooling, it is however advantageous when the cooling bodies are inserted or placed on or in an opening of the housing of the robot arm, so that they also form an inner wall portion. In this case an electrical circuit associated with such a cooling body is in direct heat transmission contact with the cooling body, so that the heat can be withdrawn in the best possible way from the inner space of the robot arm to the outer environment. For providing a maximum possible heat transfer from the electrical circuit to the cooling body, the circuit can be mounted on the cooling body mechanically.

The major part of heat is produced in such power electronics from the convertor circuits, and therefore it is advantageous to associate a cooling body at least with the at least one convertor circuit. It is to be understood that in accordance with a further embodiment it can be preferable to associate a cooling body also with at least one control circuit.

Heat which is produced not only by the circuits, but also by the motors received in the robot body parts can be withdrawn to the outer environment. As mentioned above, the housing of a robot body part can contribute to withdrawal of the heat from the inner space of the robot body part. Therefore it is advantageous, for withdrawal of heat from the inner space of a robot body part, in particular a robot arm, when a portion of a housing of a robot body part (swivel motor housing portion) forms a housing for at least one swivel motor received in the corresponding robot body part. In this case the heat can be directly transmitted from the swivel motor into the housing which as a rule is composed of metal, and from there withdrawn to the outer environment.

Structurally, the design of a housing portion of the robot body part, in particular robot arm, as a housing for a swivel motor can be realized in the simple manner when a stator of at least one swivel motor is arranged directly on the swivel motor housing portion of the robot body part, for example by snapping (shrinking) of the swivel motor housing portion on the swivel motor stator. Such mounting of the swivel motor in the swivel motor housing portion of the robot body part requires however a high mounting expense, since first the housing must be heated, before the cold motor or its stator is inserted in the heated housing, so that the stator after the cooling is fixed in the housing. The disadvantage is however more than out weighted by the improved cooling.

Such snapping of the housing of a robot body part on a swivel motor was considered by experts as not possible, since a canting of the motor or an uncontrolled warping or distortion of the housing was feared. Moreover, openings on the motor, with consideration of the distortion during snapping of the housing for mounting of the motor on it, must be manufactured with very high accuracy. This prejudice of the experts was overcome by the inventors of the invention disclosed in the present application.

The inventive objective, namely to provide a SCARA robot with compact dimensions and improved dynamic properties, is achieved in accordance with a further feature of the present invention with respect to the mechanics in the robot, when a robot arm has two working motors for the movement drive of the work unit, with each working motor is provided with a motor shaft with a drive longitudinal end, from which the drive force can be picked up, wherein the working motors are arranged in the robot arm with substantially parallel motor shafts but with opposite orientations so that the drive longitudinal ends face in opposite directions. With the above described orientation of the working motors in the robot arms, the provision of a deviating device can be avoided, which before was required for deviation of a force transmission device, such as a belt or a toothed belt for transmitting a drive force from the work motor to the work unit. By eliminating this deviating device, the mass and thereby the mass moment of inertia of the robot arm is reduced. The advantage of this motor arrangement will be illustrated below with respect to the preferable embodiments, in which the robot arm is the previously mentioned second robot arm and as a working assembly it includes a robot spindle which is rotatable about a rotary axis and is placeable independently from it in direction of the rotary axis.

With this arrangement of the working motors, which are incorporated in the second robot arm being turned relative to one another substantially by 180°, the corresponding drive pickup locations of the drive for turning of the robot spindle around its turning axis and the drive for displacement of the robot spindle in direction of the turning axis in this rotary axis direction can be arranged with a distance from one another, without increasing the dimensions of the robot arm in direction of the rotary axis. This can be achieved in that both work motors of this type occupy a common extension portion of the second robot arm in direction of the motor shaft of the working motors. Belts of a belt drive, for example toothed belts, can be used which conventionally transmit a drive force from a drive end of a work motor to a corresponding drive of the robot spindle, correspondingly substantially in a plane. Since the belt planes are arranged with the distance from one another, the both belts do not interfere in their arrangement. With a non turned, same-direction arrangement of the work motors, they must be arranged either with a greater distance orthogonally to the longitudinal direction of their motor shafts with the increase of the mass moment of inertia of the robot arm, or they must be offset in the longitudinal direction of their motor shafts with an increase of the structural height of the robot arm, or they must be articulated on one another with a deviating device that increases the mass and thereby the mass moment of inertia of the robot arm.

It is especially advantageous when each work motor has a motor body connected with its motor shaft in the motor shaft longitudinal direction on the drive longitudinal end, and the motor bodies of the both work motors in the motor shaft longitudinal direction are arranged in a common extension region of the second robot arm extending in a motor shaft longitudinal direction, between the both drive longitudinal ends. Then, on each drive end, a force transmitting device for force transmission from a drive longitudinal end of a work motor to a drive on the robot spindle can be arranged, without extending one working motor in the motor shaft longitudinal direction over the corresponding other working motor. Thereby an increase of the structural height of the second robot arm is completely avoided.

When the both work motors have motor bodies of different lengths, it is advantageous for a compact construction to arrange the shorter one so that its motor body does not extend in the motor shaft longitudinal direction outwardly beyond the longer motor body.

For the work motors, with respect to the heat withdrawal through the housing of the second robot arm, the above mentioned with respect to the swivel motors is true. Therefore, for an effective cooling of the work motor and the second robot arm as a whole, it is advantageous when a portion of a housing of the second robot arm (working motor housing portion) forms a housing for at least one of the working motors.

This can be realized structurally as described above, in that a stator of at least one working motor is arranged directly on the working motor housing portion of the second robot arm, for example by snapping (shrinking) of the working motor housing portion of the working motor stator.

In correspondence with a preferable embodiment of the inventive SCARA robot, the first robot arm is a passive robot arm, or in other words it includes no drives, while the second robot arm is an active robot arm. Correspondingly, in this embodiment the at least one swivel motor for swiveling of the arm unit composed of first and second robot arms relative to the robot console, is received in the robot console. Furthermore, the at least one swivel motor for turning the second robot arm relative to the first robot arm is received in the second robot arm. Thereby the first robot arm can be designed very simply.

Furthermore, in the preferable embodiment for each robot body part provided with motors, its own control circuit is provided which is received in the corresponding robot body part. Thereby a cable wiring and cable expenses for providing the operability of the robot are reduced. Further, for increasing the operational safety, at least a part of the swivel and working motors can be provided with a mechanical brake. With such brakes, the motors can be mechanically stopped in a currentless condition. Thereby, with such mechanical brakes, safety aspects can be realized, for example for preventing changes of the orientation of the robot body parts relative to one another with turned-off swivel motors.

Finally, in the inventive compact SCARA robot in accordance with a preferable embodiment of the present invention, a dc-ac rectifier of the power electronics is received in the robot console. This rectifier produces a direct voltage from an electric power network voltage, which is required for robots, in particular for the convertor circuits. This leads to the situation that outside the robot, only such electronics is located in which no significant electrical power is converted. Thereby the cooling expenses for the electronics remaining outside of the inventive SCARA robot are low, which allows a significant size reduction of the switch cabinet outside of the robot. By receiving the rectifier in the robot console, or in other words in an immovable robot body part, the movable masses of the robots are not increased, with simultaneously provided compact construction.

The motors used in the SCARA robot are electric motors. Preferably, alternating current-operated motors are utilized, whereby the above mentioned convertors are dc/ac rectifiers. However, it is not excluded that also direct current motors and corresponding rectifiers can be utilized.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
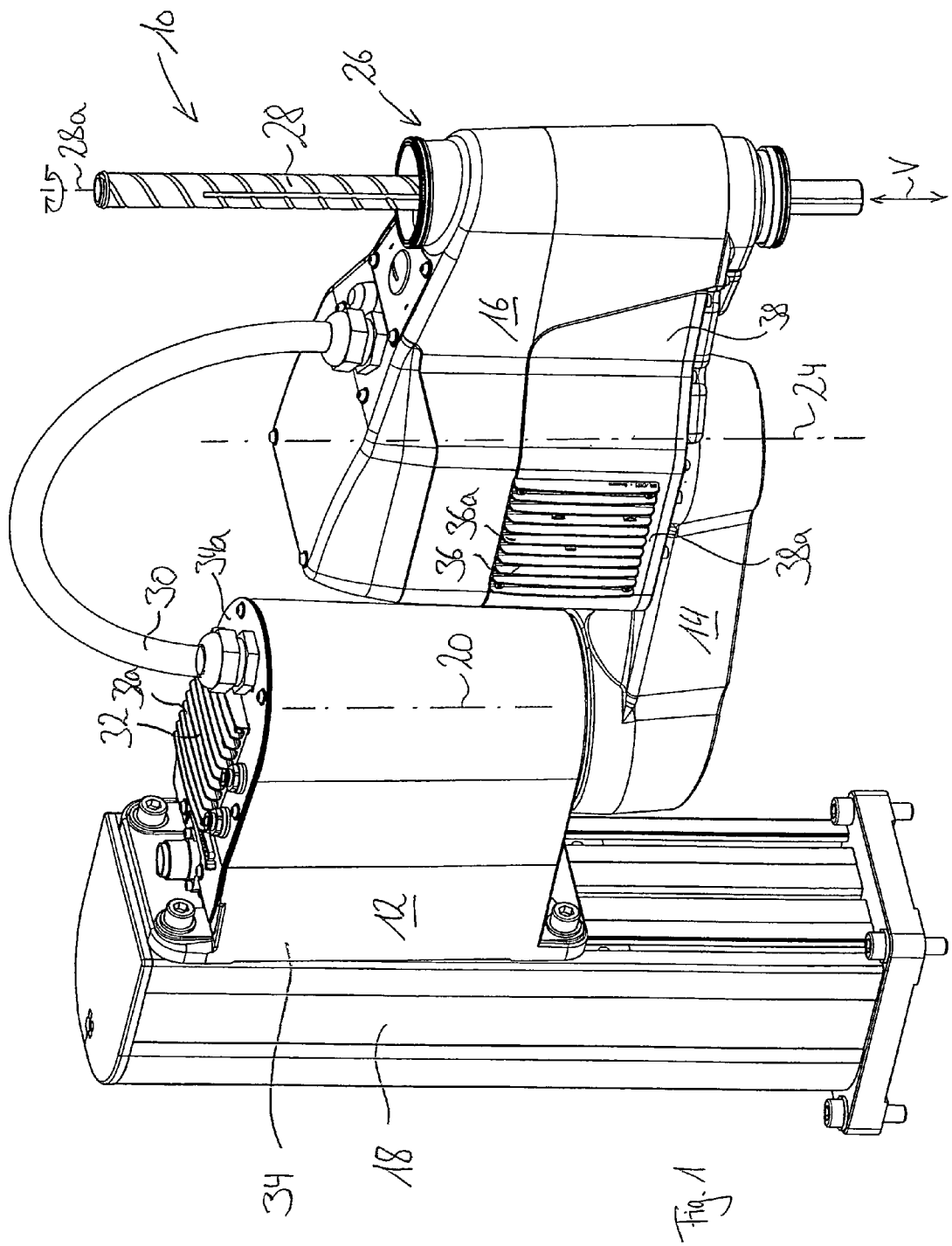
FIG. 1 is a perspective outside view of an inventive SCARA robot.

A SCARA robot in accordance with the present invention shown in FIG. 1 is identified as a whole with reference numeral 10. The SCARA robot 10 includes as a robot body parts a robot console 12, a first passive robot arm 14, and a second active robot arm 16.

The robot console 12 is mounted on a support 18 and held on it stationary. The support 18 can be fixed on a foundation or also on a movable vehicle. The first robot arm 14 is mounted on the robot console 12 swivelably around a first swivel axis 20 on its lower side. Furthermore, the second robot arm 16 is mounted on the first robot arm 14 swivelably about a second swivel axis 24. The swivel axes 20 and 24 are substantially parallel to one another.

On its swivel axis-distal longitudinal end, the second robot arm 16 has a work unit 26. The work unit 26 includes a robot spindle 28 which is arranged in its longitudinal direction substantially parallel to the swivel axes and 24. The robot spindle 28 is displaceable in its longitudinal direction, or in other words in direction of the double arrow V and is rotatable independently from it around its longitudinal axis 28*a*.

The first robot arm 14 is a passive robot arm, since it does not have any motors. A swivel motor for swiveling movement of the assembly composed of the first and second robot arms 14 and 16 relative to the robot console 12, is received in the robot console 12. The swivel motor for turning of the second robot arm 16 relative to the first robot arm 14 is received in the second robot arm 16. A connecting cable 30 connects the robot console 12 and the second robot arm 16 for transmission of energy (current) and information between the both robot body parts.

A cooling body 32 can be recognized from outside on the robot console 12, on its upper side. It has ribs 32*a*. The cooling body 32 forms a part of the wall 34*a* of the housing 34 of the robot console 12. For this purpose the cooling body 32 is inserted in a cut-out opening of the wall 34*a*. The cooling body 32 is connected with a convertor, and in particular a dc/ac rectifier and serves for its cooling. This dc/ac rectifier is shown in FIG. 1.

Similarly, a cooling body 36 with ribs 36*a* is inserted in a cut-out of a wall portion 38*a* of the housing 38 of the second robot arm, so that the cooling body 36 forms a part of the housing wall of the housing 38. A convertor, in particular a dc/ac rectifier, is associated with the cooling body 36, not shown in FIG. 1.

Figure 2:
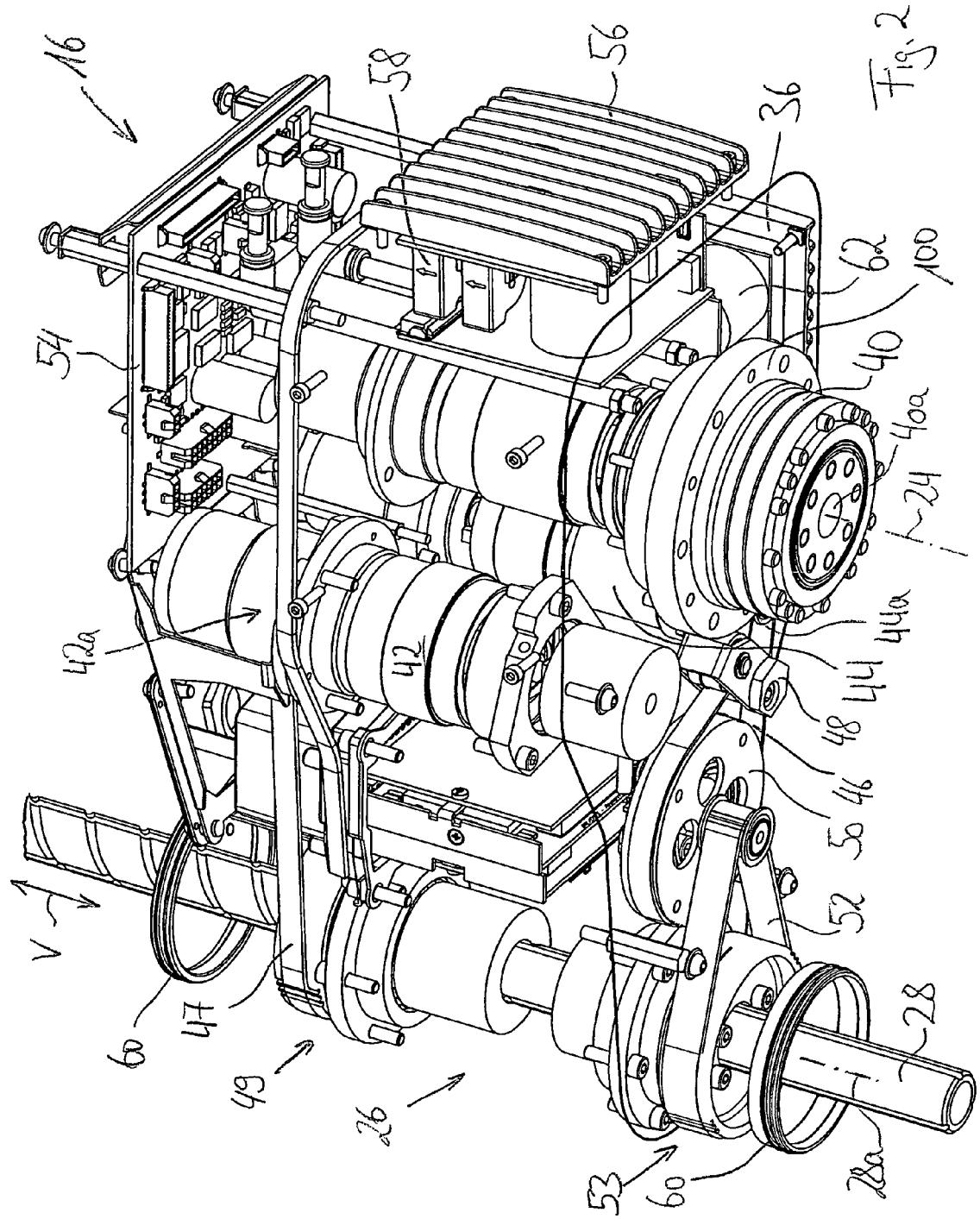
FIG. 2 is a perspective view of a second robot arm of the SCARA robot in FIG. 1, with a removed housing of the robot arm.

FIG. 2 shows a perspective view of the second robot arm 16 from an observation position from below as well as inclinedly behind the second robot arm 16. The housing 38 for better illustration of the interior of the second robot arm 16, is removed.

FIG. 2 clearly shows the swivel motor 40, whose motor shaft 14 is arranged along the second swivel axis 24. Furthermore, FIG. 2 shows a first working motor 42 and a second working motor 44. The working motors 42 and 44 are substantially parallel and located near one another, but turned by 180°, and received in the second robot arm 16. This means that the drive longitudinal end 42 of the first working motor 42, from which a drive force for lifting and lowering of the spindle can be picked up, is arranged near the upper end of the second robot arm 16, while the drive longitudinal end 44*a* of the second work motor 44 is arranged near the lower end of the second robot arm 16. A toothed belt 46 is guided from the drive longitudinal end 44*a* of the second work motor 44 via a belt tensioner 48 to a lowering gear 50 which lowers the speed of the toothed belt 46. From the lowering gear 50, a further toothed belt 52 leads to a drive unit 53, via the robot spindle 28 is drivable in rotation around its longitudinal axis 28*a*. With this motor arrangement, a belt deviating device can be dispensed with, and the mass and the masses moment of inertia of the robot arm are reduced.

A control circuit 54 is arranged on the upper end of the second robot arm 16 and controls the operation of the motors 40, 42 and 44. On the end of the second robot arm which is remote from the working unit 26, a further cooling body 56 is provided. A convertor, in particular a dc/ac rectifier 58, is mounted on the cooling body 56, which has a construction identical to those of the cooling bodies 32 and 36. Also, the cooling body 56 is inserted in a cut-out opening on the wall 38*a* of the housing 38 of the second robot arm 16.

A toothed belt 47 is guided from the drive longitudinal end 42*a* around a lifting and lowering drive 49 of the robot spindle 28. Thereby the robot spindle 28 is liftable and lowerable in the direction of the double arrow V.

A ring 60 which is shown in FIG. 2 floating because of leaving out of the housing 38 of the second robot arm 16, serves for mounting of sealing means for sealing the passage of the robot spindle 28 through the housing 38.

Moreover, FIG. 2 shows a part of the convertor 62, which is connected with the cooling body 36 shown in FIG. 1.

Figure 3:
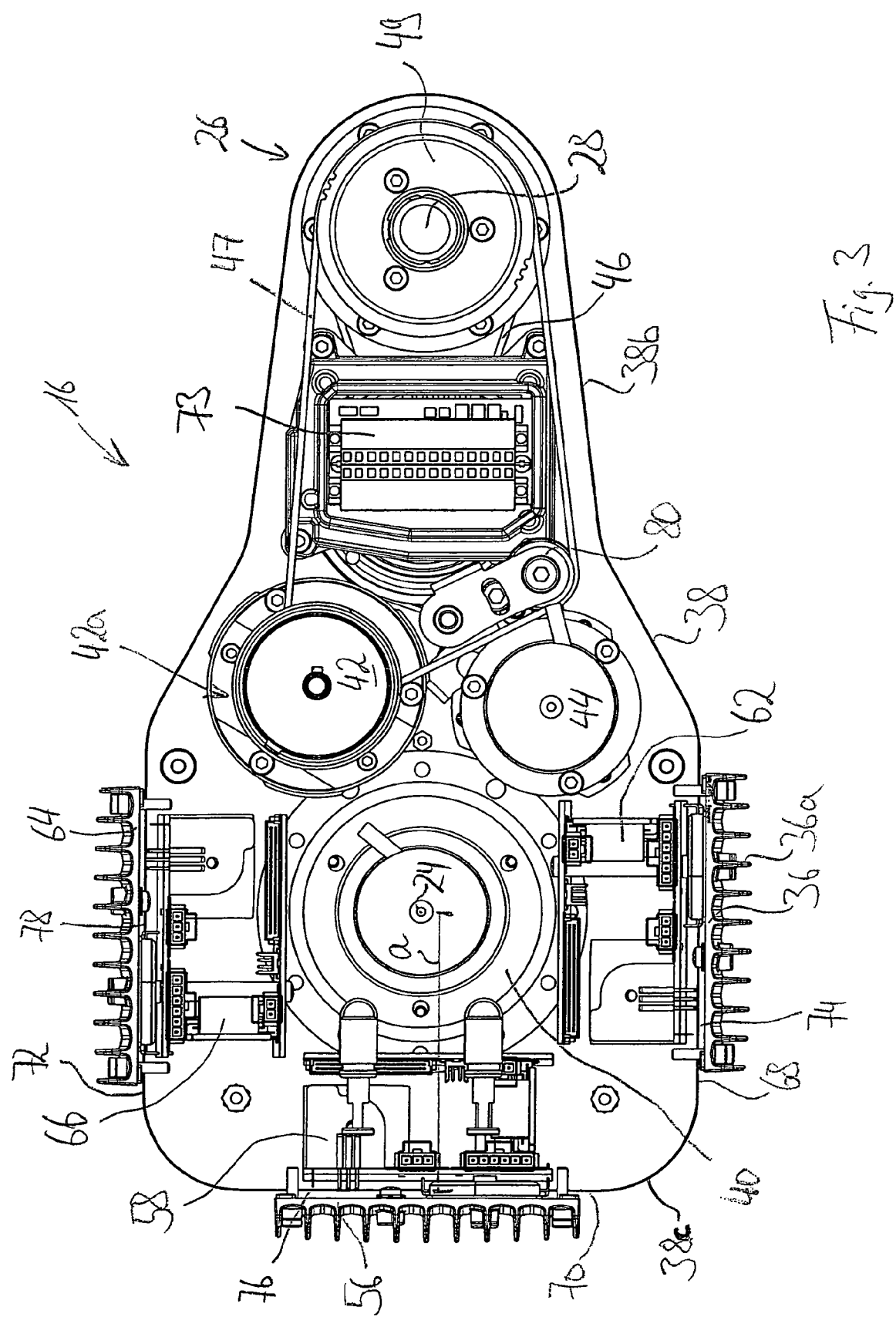
FIG. 3 is a plan view of the second robot arm of FIG. 2, with removed cover of the robot arm.

FIG. 3 shows a plan view of the second robot arm 16, wherein the cover is removed so that the interior of the robot arm 16 can be seen.

As can be seen from FIG. 3, a third cooling body 64 is received in the housing 38 in a cut-out opening, so that it forms a part of the housing wall. A third convertor 66 is associated with the cooling body 64. For example, the convertor 62 can be associated with the work motor 44, the convertor 58 can be associated with the swivel motor 40, and the convertor 66 can be associated with the work motors 42. All convertors and motors are controlled by the control circuit 54 shown in FIG. 2. The supply of the second robot arm 16 with current and information from a higher-ranking assembly is performed through the robot console 20 by means of the connecting cable 30 shown in FIG. 1.

It can be further seen from FIG. 3, that the housing 38 has a housing portion 38*c* which is proximal to the swivel axis 24 and a housing portion 38*b* which is distal from the swivel axis 24. The work unit 26 is arranged in the swivel axis-distal housing portion 38*b*, while the swivel motor and the convertors 58, 62 and 64 with the associated cooling bodies 36, 56, and 64 are arranged in the swivel axis-proximal housing portion 38*c*.

The swivel axis-proximal housing portion 38*c* has three flat housing portions 68, 70 and 72 which are arranged parallel to the swivel axis 24 and have a shortest distance from the swivel axis. For example, the distance a from the swivel axis 24 to the housing portion 70 is shown. The arrangement of the convertors 58, 62 and 68 with associated cooling bodies 36, 56, and 64 on the swivel axis-proximal housing portions 68, 70 and 72 has the advantage that the second robot arm 16 has a lowest possible mass moment of inertia with respect to a rotation around the swivel axis 24. The flat design of the housing portion 68, 70, and 72 facilitates the placement of the convertors and the cooling bodies. In addition the work motors 42 and 44 are arranged as close as possible to the swivel motor 40.

It should be further mentioned that a storage unit 73 is provided between the work motors 42 and 44 and the robot spindle 28. In the storage unit 73 robot-specific features are stored, such as, e.g. types, arm dimensions, calibration data, and the like. Therefore, a universal control in a not shown switch cabinet detects and recognizes the SCARA robot and in the case of repair the control can be exchanged without a new calibration of the SCARA robot.

A work device is connectable to the storage unit 73 and places the user on a longitudinal end of the robot spindle 26 provided for it. For connecting the storage unit 73 with such a work device, a plurality of digital and analog inputs and outputs are provided. Optionally, also a field bus connection can be provided.

It can be seen further from FIG. 3, that the cooling bodies 36, 56, and 64 cover the cut-out openings 74, 76 and 78 and thereby form a part of the housing 38. Finally, the tensioner 80 of the toothed belt 47 should be mentioned.

Figure 4:
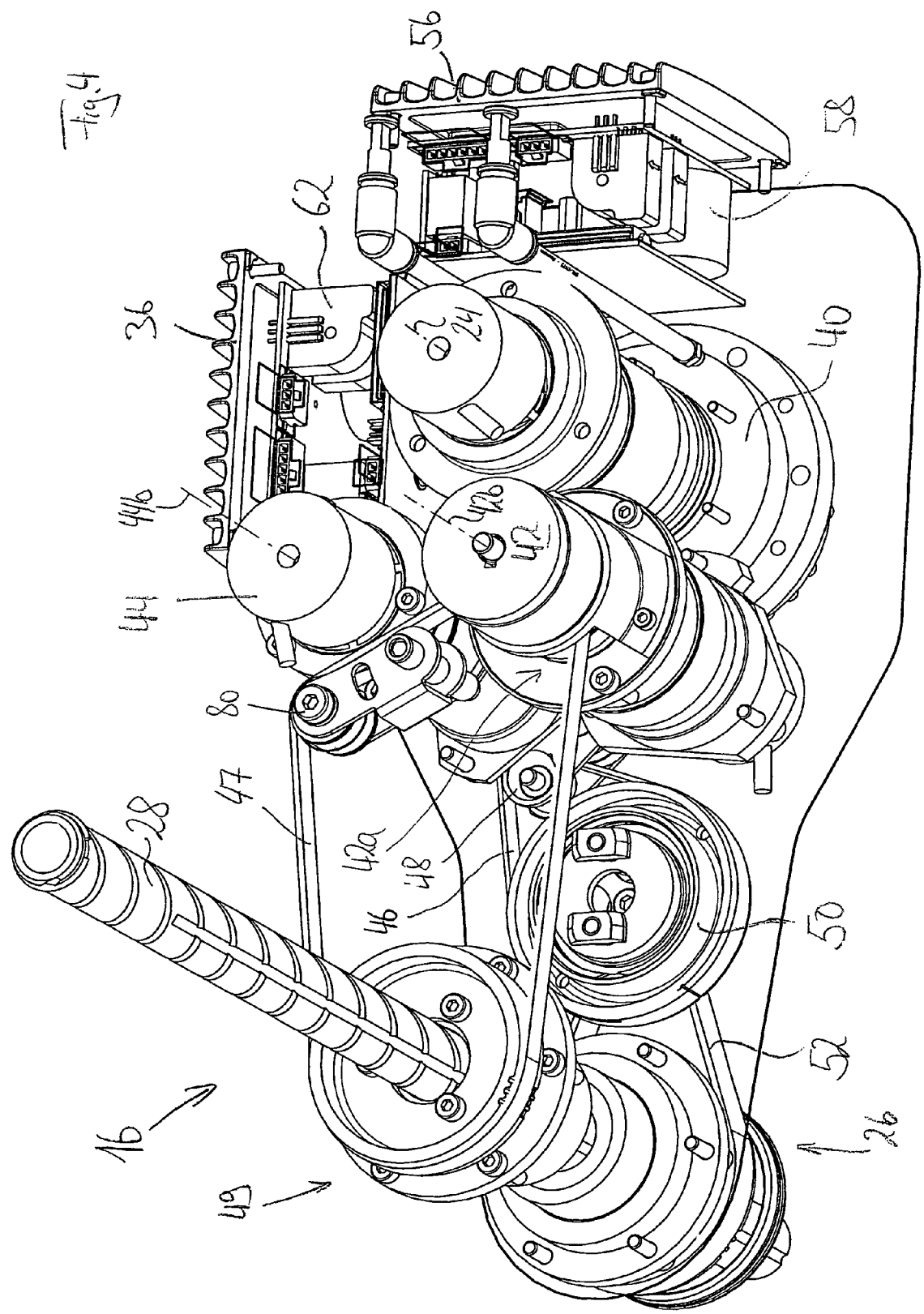
FIG. 4 is a further perspective view of the second robot arm with the removed housing.

FIG. 4 which is a view of the second robot arm 16 without the housing 38 inclinedly from above, shows that the work motors 42 and 44 are located substantially exactly near one another, or in other words the work motors 42 and 44 occupy in the extension direction of their parallel motor shafts 42b and 44b substantially the same structural region of the second robot arm 16. Thereby the work motors 42 and 44 are arranged so that in the longitudinal direction of the motor shaft 42b, 44b one work motor does not extend outwardly beyond the other, and thereby a low structural height of the second robot arm 16 in the longitudinal direction of the motors is provided. Moreover, the belt drives do not interfere with one another, so that when compared with conventional arrangements, belt deviating devices can be dispensed with. Thereby the mass and the mass moment of inertia of the robot arm is reduced.

It should be finally mentioned that the axes of all rotatable parts in the second robot arm 16, or in other words the shafts of the motors 40, 42, and 44, the lowering gear 50, the robot spindle 28 and both the belt tensioners 48 and 80 as well as the rotary parts arranged on them, are oriented substantially parallel to one another. In FIG. 4 the cooling body 64 and the convertor 66 are not illustrated.

Figure 5:
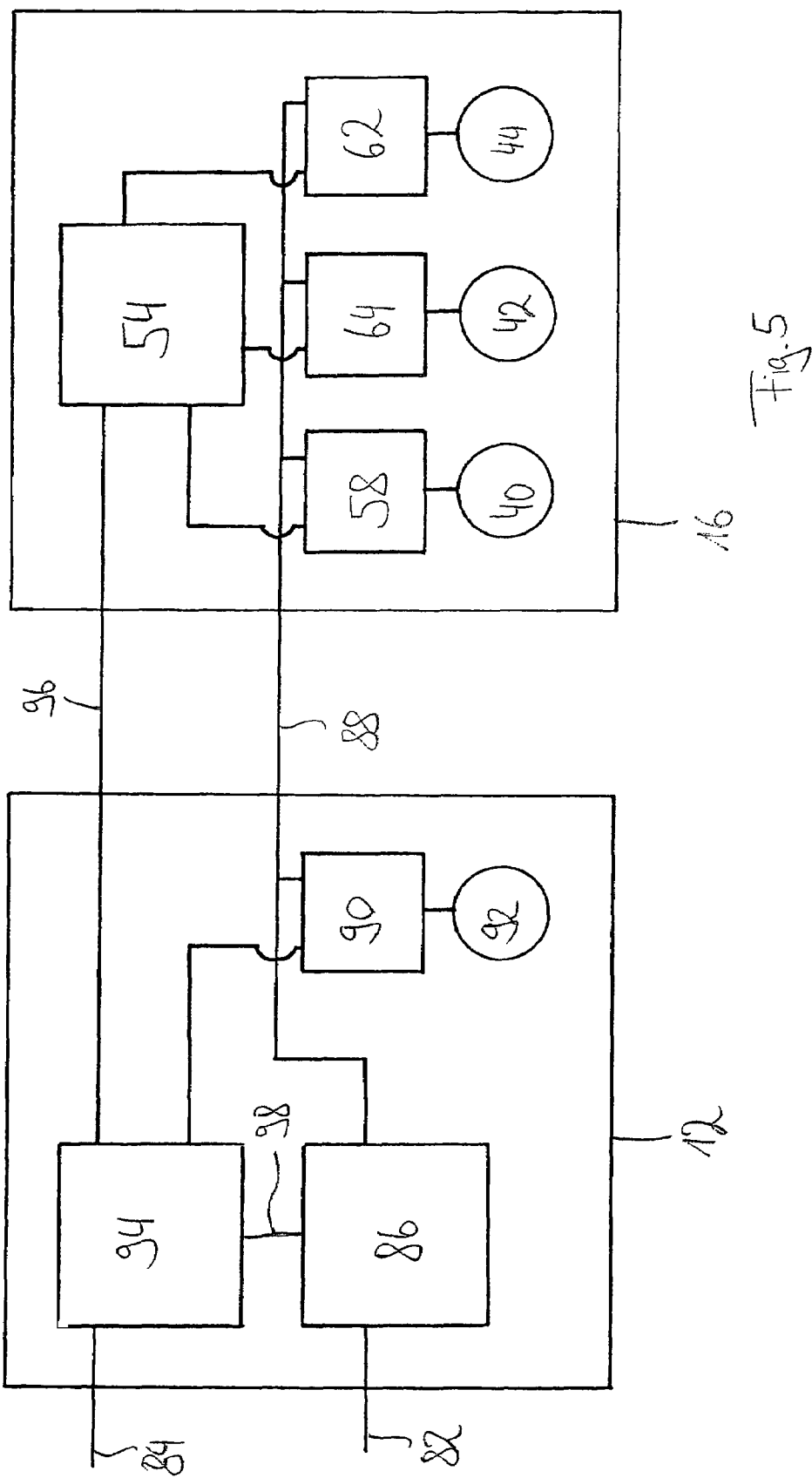
FIG. 5 is a schematic wiring diagram for showing cable connections of the drive of the inventive SCARA robot.

FIG. 5 shows a wiring diagram of the SCARA robot 10 in a simplified fashion. An alternating voltage power supply conductor 82 and a control conductor 84 are guided in the robot console 12. The alternating voltage power supply conductor 82 leads to a rectifier 86 which produces a direct voltage that is supplied, through a direct voltage conductor 88 to the dc/ac rectifiers 58, 62 and 64 in the second robot arm 16 as well as a dc/act rectifier 90 in the first robot arm. The dc/ac rectifier 90 provides an alternating voltage for the first swivel motor 92. The remaining DC/AC rectifiers 58, 62 and 64 in the second robot arm 16 are connected with the motors 40, 42, and 44 as described above.

The control conductor 84 is connected with a control circuit 94 for the robot console 12 and the control circuit 54 in the second robot arms 16. The control circuits 94 and 54 are connected via a control connecting conductor 96, and moreover the control circuits and 94 and 54 are connected with the dc/ac rectifiers received in the associated robot body part. Moreover, the control circuit 94 is connected via a further control connecting conductor 98 with the rectifier 86 for its control. By controlling the rectifier 86 as well as the dc/ac rectifiers 58, 62, 64 and 90 the motors 92, 40, 42 and 44 can be controlled correspondingly.

Supplementary, the swivel motor 40 of the second robot arm 16 at its end which faces the first robot arm 14 can be provided with a harmonic drive transmission 100.

It will be understood that each of the elements described above, or two or more together, may also find a useful application in other types of constructions differing from the types described above.

While the invention has been illustrated and described as embodied in robot of scara type, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A SCARA robot, comprising a robot console; a first robot arm articulated on said robot console swivelable around a first swivel axis; a second robot arm articulated on said first robot arm swivelably around a second swivel axis extending substantially parallel to said first swivel axis, said second robot arm having at least one work unit; at least one first swivel motor for swiveling an arm unit composed of said first and second robot arms relative to said robot console; at least one second swivel motor for swiveling said second robot arm relative to said first robot arm; at least one work motor for actuation of said work unit; power electronics controlling said motors and having electrical circuits including convertor circuits for a current supply of said motors and at least one control circuit for operating said convertor circuits and thereby for controlling said motors, at least one circuit selected from said convertor circuits and said control circuits being arranged in at least one of said robot arms on a wall portion of a housing of said at least one robot arm associated with said at least one circuit, wherein said at least one robot arm has a swivel axis-proximal portion and a swivel axis-distal portion relative to a swivel axis of said at least one robot arm, and said wall portion of said housing with at least one of said circuits arranged on it being located in said swivel axis-proximal housing portion.

2. A SCARA robot as defined in claim 1, wherein said housing wall portion with said associated at least one circuit is a housing wall portion with a shortest distance from said swivel axis of said said at least one robot arm.

3. A SCARA robot as defined in claim 1, wherein said at least one robot arm has a plurality of electrical circuits including at least one convertor circuit and at least one control circuit, wherein each of said circuits is arranged on a wall portion of said housing of said one robot arm which wall portion is associated with a corresponding circuit.

4. A SCARA robot as defined in claim 3, wherein said housing wall portions with said circuits arranged on them are housing wall portions which have shortest distances from said swivel axis of said at least one robot arm.

5. A SCARA robot as defined in claim 4, wherein at least one of said circuits is a convertor circuit.

6. A SCARA robot as defined in claim 1, wherein at least one of said convertor circuits is associated with a respective one of said motors, and said associated convertor circuit is received in the same at least one robot arm as a corresponding one of said motors.

7. A SCARA robot as defined in claim 1; and further comprising cooling bodies associated with at least a part of said electrical circuits and forming an outer wall portion of a housing of at least one of said robot arms.

8. A SCARA robot as defined in claim 7, wherein said cooling bodies form an inner wall portion of said housing of said at least one robot arm.

9. A SCARA robot as defined in claim 7, wherein at least one of said cooling bodies is associated with at least one of said convertor circuits.

10. A SCARA robot as defined in claim 1, wherein a portion of a housing of at least one of said robot arms forms a housing for at least one swivel motor received in a respective one of said robot arms.

11. A SCARA robot as defined in claim 10, wherein a stator of said at least one swivel motor is arranged directly on a swivel motor housing portion of a respective one of said robot arms.

12. A SCARA robot as defined in claim 11, wherein said stator of said at least one swivel motor is arranged directly on said swivel motor housing portion of said robot arm by snapping of said swivel motor housing portion on said stator.

13. A SCARA robot, comprising a robot console; a first robot arm articulated on said robot console swivelable around a first swivel axis; a second robot arm articulated on said first robot arm swivelably around a second swivel axis extending substantially parallel to said first swivel axis, said second robot arm having at least one work unit; at least one first swivel motor for swiveling an arm unit composed of said first and second robot arms relative to said robot console; at least one second swivel motor for swiveling said second robot arm relative to said first robot arm; at least one work motor for actuation of said work unit; power electronics controlling said motors and having electrical circuits including convertor circuits for a current supply of said motors and at least one control circuit for operating said convertor circuits and thereby for controlling said motors, at least one circuit selected from said convertor circuits and said control circuits being arranged in at least one of said robot arms on a wall portion of a housing of said at least one robot arm associated with said at least one circuit, one of said robot arms having two work motors for a movement drive of said work unit with each of said work motors having a motor shaft with a drive longitudinal end from which a drive force can be picked up, said work motors being arranged in said at least one robot arm with substantially parallel motor shafts but in opposite orientation, so that said drive longitudinal ends face in opposite directions.

14. A SCARA robot as defined in claim 13, wherein at least one robot arm is said second robot arm and includes as said work unit a robot spindle which is rotatable around a rotary axis and displaceable, independently from the rotation, in direction of said rotary axis, said work motors forming a movement drive for said robot spindle.

15. A SCARA robot as defined in claim 13, wherein each of said work motors has a motor body arranged in a motor shaft longitudinal direction adjacent to said drive longitudinal end of its motor shaft, said motor bodies of said work motors in said motor shaft longitudinal direction being arranged in a common extension region of said robot arm in said motor shaft longitudinal direction between two said longitudinal ends.

16. A SCARA robot as defined in claim 13, wherein a portion of the housing of said second robot arm forms a housing for at least one of said work motors.

17. A SCARA robot as defined in claim 16, wherein a stator of at least one work motor is arranged directly on a work motor housing portion of said second robot arm.

18. A SCARA robot as defined in claim 17, wherein said stator of at least one work motor is arranged directly on said work motor housing portion of said second robot arm by shrinking of said work motor housing portion on said stator.

19. A SCARA robot as defined in claim 13, wherein one of said swivel motors for swiveling said arm unit composed of said first and second robot arms relative to said robot console is received in said robot console.

20. A SCARA robot as defined in claim 13, wherein at least one of said swivel motors for swiveling said second robot arm relative to said first robot arm is received in said second robot arm.

21. A SCARA robot as defined in claim 13, wherein at least one of said control circuits for controlling a motor provided in a respective one of robot body parts is received in said robot console and in said robot arm, respectively.

22. A SCARA robot as defined in claim 13, wherein at least a part of said swivel-and work motors are provided with a mechanical brake.

23. A SCARA robot as defined in claim 13, wherein said power electronics has a rectifier which from an electrical power supply voltage produces a direct voltage, said rectifier being received in said robot console.

* * * * *